United States Patent
Wo et al.

(10) Patent No.: US 10,527,920 B1
(45) Date of Patent: Jan. 7, 2020

(54) SYSTEM, METHOD AND DEVICE FOR A HIGH FIDELITY ELECTRO-OPTICAL SIMULATOR

(71) Applicant: DHPC Technologies, Inc., Woodbridge, NJ (US)

(72) Inventors: Yei Wo, East Brunswick, NJ (US);
Bruce P. Boczar, Trevose, PA (US);
Richard Gifford, Toms River, NJ (US);
Joseph M. Aletta, Jackson, NJ (US)

(73) Assignee: DHPC Technologies, Inc., Woodbridge, NJ (US)

( * ) Notice: Subject to any disclaimer, the term of this patent is extended or adjusted under 35 U.S.C. 154(b) by 0 days.

(21) Appl. No.: 16/297,538

(22) Filed: Mar. 8, 2019

Related U.S. Application Data

(60) Provisional application No. 62/685,117, filed on Jun. 14, 2018.

(51) Int. Cl.
*G03B 21/60* (2014.01)
*G03B 21/56* (2006.01)
(Continued)

(52) U.S. Cl.
CPC ......... *G03B 21/60* (2013.01); *G02B 27/2221* (2013.01); *G03B 21/56* (2013.01); *G03B 21/58* (2013.01); *G03B 21/62* (2013.01)

(58) Field of Classification Search
CPC ....................................................... G03B 21/56
(Continued)

(56) References Cited

U.S. PATENT DOCUMENTS

| 2,042,174 | A | * | 5/1936 | Foisy | ..................... | A61B 5/162 |
| | | | | | | 124/32 |
| 3,263,561 | A | * | 8/1966 | Jackson | ................. | G03B 21/60 |
| | | | | | | 359/451 |

(Continued)

FOREIGN PATENT DOCUMENTS

CN             104655111 A      1/2017

OTHER PUBLICATIONS

John M. Stewart et al., 'Correlated UV Through IR Signature Modeling of Targets and Backgrounds' Georgia Institute of Technology, Nov. 1998, 11 pages (Year: 1998).*

(Continued)

*Primary Examiner* — Clayton E. LaBalle
*Assistant Examiner* — Kevin C Butler
(74) *Attorney, Agent, or Firm* — LaMorte & Associates P.C.

(57) ABSTRACT

A system, method, and device for simulating an emission signature, which contains representative intensity, temporal, and spectral emission profiles of a weapon system or weapon platform for the purpose of testing an optical detection device. A projection system optically projects the emission signature. A projection screen is provided that has a concave curvature. The concave curvature possesses a first focal point and a second focal point. Any light emanating from the second focal toward the projection screen is reflected by the projection screen toward the first focal point. The projection system is positioned at the second focal point and the optical detection system is positioned at the first focal point. In this manner, the emission signature projected by the projector system is redirected to the optical detection system.

11 Claims, 4 Drawing Sheets

(51) Int. Cl.
  *G02B 27/22* (2018.01)
  *G03B 21/62* (2014.01)
  *G03B 21/58* (2014.01)

(58) Field of Classification Search
  USPC .......................................................... 359/451
  See application file for complete search history.

(56) References Cited

U.S. PATENT DOCUMENTS

| | | | | |
|---|---|---|---|---|
| 3,292,491 A * | 12/1966 | Jules | ...................... | G03B 21/56 353/122 |
| 3,508,056 A * | 4/1970 | Fricke | .................. | G01K 17/003 250/336.1 |
| 3,557,470 A * | 1/1971 | Emerick et al. | ......... | G09B 9/32 352/131 |
| 3,603,726 A * | 9/1971 | Garber | .................... | G06E 3/001 348/123 |
| 3,738,168 A * | 6/1973 | Mansell | .................... | G01J 5/12 250/349 |
| 3,748,751 A * | 7/1973 | Breglia | ................. | F41G 3/2627 434/21 |
| 3,784,742 A * | 1/1974 | Burnham | ........... | G02B 27/0101 348/123 |
| 3,811,204 A * | 5/1974 | Marshall | ............... | F41G 3/2627 434/22 |
| 3,838,856 A * | 10/1974 | Takeya | ................. | F41G 3/2655 345/156 |
| 3,904,204 A * | 9/1975 | Yokoi | ................... | F41G 3/2627 362/112 |
| 3,939,706 A * | 2/1976 | Pinson | .................. | G01J 1/4257 374/32 |
| 3,945,133 A * | 3/1976 | Mohon | ................. | F41G 3/2611 434/20 |
| 4,037,470 A * | 7/1977 | Mock | ................... | G01K 17/003 374/32 |
| 4,137,651 A * | 2/1979 | Pardes | ....................... | F41J 5/10 434/20 |
| 4,175,748 A * | 11/1979 | Yokoi | ........................ | F41J 9/14 273/358 |
| 4,223,454 A * | 9/1980 | Mohon | ................ | F41G 3/2627 434/20 |
| 4,229,009 A * | 10/1980 | Ohta | ...................... | A63F 9/0291 273/358 |
| 4,321,824 A * | 3/1982 | Martin | ....................... | F41J 5/02 250/349 |
| 4,440,506 A * | 4/1984 | Eitel | .................... | G01K 17/003 374/32 |
| 4,657,511 A * | 4/1987 | Allard | ..................... | F41G 3/2627 434/20 |
| 4,797,555 A * | 1/1989 | La Mar | ................. | G01J 1/4257 250/336.1 |
| 4,824,374 A * | 4/1989 | Hendry | ................. | F41G 3/2611 434/21 |
| 5,175,575 A * | 12/1992 | Gersuk | ................... | G03B 21/56 352/69 |
| 5,194,006 A * | 3/1993 | Zaenglein, Jr. | ........ | F41G 3/2694 273/371 |
| 5,376,980 A * | 12/1994 | Gersuk | ................... | G03B 21/56 353/94 |
| 5,638,208 A * | 6/1997 | Walker | .................... | G03B 21/56 359/443 |
| 5,850,225 A * | 12/1998 | Cosman | ................... | G06T 3/005 345/427 |
| 6,176,584 B1 * | 1/2001 | Best | ........................ | G09F 19/18 353/30 |
| 6,942,486 B2 * | 9/2005 | Lvovskiy | ................ | F41A 33/02 434/11 |
| 8,185,350 B2 * | 5/2012 | Deriso, Jr. | ............... | F41G 7/002 244/1 N |
| 8,441,625 B2 * | 5/2013 | Wick, Jr. | ............... | G01J 1/4257 356/121 |
| 8,794,967 B2 * | 8/2014 | Sargent | ................... | A63F 13/06 434/11 |
| 8,988,674 B2 * | 3/2015 | Anikitchev | ........... | G01J 1/0407 356/236 |
| 9,042,694 B2 * | 5/2015 | Silny | ..................... | G01J 1/0425 385/115 |
| 2003/0180692 A1 * | 9/2003 | Skala | ........................ | F41G 1/35 434/22 |
| 2007/0254266 A1 * | 11/2007 | Galanis | ................... | F41G 3/2627 434/21 |
| 2008/0206720 A1 | 8/2008 | Nelson | | |
| 2010/0240015 A1 * | 9/2010 | Chung | .................. | F41G 3/2694 434/21 |
| 2011/0207089 A1 * | 8/2011 | Lagettie | ................ | F41G 3/2611 434/22 |
| 2012/0183931 A1 * | 7/2012 | Galanis | ...................... | F41J 5/10 434/22 |
| 2013/0040268 A1 * | 2/2013 | Van der Walt | ......... | F41A 33/06 434/16 |
| 2013/0308183 A1 * | 11/2013 | Vermeirsch | ............ | G03B 21/62 359/451 |

OTHER PUBLICATIONS

David M. Krum et al., 'Augmented Reality Using Personal Projection and Retroreflection', University of Southern California, Jan. 1, 2012, 21 pages (Year: 2012).*

H.S. Lowry et al., 'Development of HWIL Testing Capabilities for Satellite Target Emulation at AEDC', Arnold Engineering Development Center (AEDC), 2006, 10 pgs (Year: 2006).*

* cited by examiner

SYSTEM, METHOD AND DEVICE FOR A HIGH FIDELITY ELECTRO-OPTICAL SIMULATOR

RELATED APPLICATIONS

This application claims the benefit of U.S. Provisional Patent Application No. 62/685,117, filed Jun. 14, 2018.

GOVERNMENT CONTRACT

This invention was developed under government contract US ARMY TARDEC, SBIR CONTRACT NUMBER: W56HZV-18-C-0018

BACKGROUND OF THE INVENTION

1. Field of the Invention

In general, the present invention relates to simulators that are used to simulate the emission signatures of various weapon systems and weapon platforms, such as rocket plumes, muzzle flashes, engine exhaust, and the like for the purpose of calibrating and testing detection equipment. More particularly, the present invention relates to simulators that are designed to reproduce the emission signatures of weapon systems and weapons platforms in the ultraviolet, visible, and infrared spectral regions and direct such emissions toward detection equipment in a manner that mimics the real-world situation.

2. Prior Art Description

When a weapon system is fired, a projectile is typically launched that is propelled by a burning propellant. This is true for bullets that are fired from guns, shells that are fired from cannons, and rockets that are fired from launchers. As the burning propellant leaves the weapon and enters the ambient environment, the emission signatures produced by the burning propellant are ultraviolet, visible and infrared. The emission signatures are a result of the combustion process and have a unique mixture of ultraviolet, visible, and infrared radiation which depends on the exact constituents of the propellant used.

Different weapon systems and different ammunition within the same weapon system produce different emission signatures, which differ in size, intensity, duration and wavelength. The same is true for various weapon platforms. In addition to weapons systems, platform engine signatures can also be simulated by the invention. The engines of different air and ground vehicles each have a unique emission signatures in the ultraviolet, visible and infrared wavelengths.

On a battlefield, it is highly advantageous to locate an enemy position and to identify the weapon system, ammunition type, and weapon platform being used by the enemy at that position. It is for this reason that militaries around the world have developed spectral signature detection systems. Such detection systems are becoming commonplace in tanks, command vehicles, aircraft and the like. As the technology improves, such detection systems are even being carried by individual soldiers. Some detection systems merely attempt to detect the location of enemy fire. More sophisticated systems can detect, classify, and identify the type of weapon being fired and the ammunition or threat being used by that weapon.

In order to develop, test, and improve various detection systems for use on a battlefield, the detection systems must be exposed to repeated testing against of many weapon systems and weapon platforms. This requires that different weapon platforms be operated and different weapon systems be repeatedly fired with different ammunition. This course of testing is highly expensive and inconvenient. It requires that both exotic and common weapon systems be obtained, maintained, loaded and fired. This, in turn, requires skilled weapons operators, a large complex firing range and vast supplies of expensive ammunition. Accordingly, testing detection systems by firing real weapons and operating real weapon platforms is far too expensive and problematic to be practical.

Many of the problems associated with firing a weapon on a battlefield can be removed by simulating the threat fire. This testing involves irradiating the sensor being tested by a signature with the appropriate intensity, temporal, spatial, and spectral characteristics needed to mimic a real-world situation. This type of testing is typically referred to as Hardware-in-the Loop (HITL) testing. Using ultraviolet, visible and infrared emitters, the spectral signature of a selected weapon system or weapon platform can be simulated. However, such emitters cannot just be pointed at a detection device. In the real world, the spectral emissions of a weapon system or weapon platform move relative to the detection system. This is due to the movement of the observer, the movement of the enemy and/or the nature of the weapon being fired. Accordingly, in order to accurately simulate a weapon system and/or a weapon platform, a simulated emission signature must be able to traverse a large field of view.

One of the few practical ways to simulate a spectral emission across a large field of view is to project the simulated emission onto a screen. The screen is then used to fill the field of view of a detection system. Shining light onto a screen for detection by a camera system is an old technology exemplified by U.S. Patent Application Publication No. 2012/0183931 to Galanis. However, such systems cannot be adapted to the present need. When light is projected onto a screen, only a small fraction of that light is reflected back from any point on the screen to an observer. As such, in order for a few points on a screen to reflect back the emission profile of a real weapon, very powerful and expensive projectors would have to be used. Additionally, due to the power of the projectors, a specialized high-temperature screen would have to be utilized and operators of the system would have to wear protective gear.

Accordingly, a great need exists for creating a simulator that can accurately simulate the emission signature of a weapon system or weapons platform without requiring high-powered projection equipment and specialized projection screens. This need is met by the present invention as described and claimed below.

SUMMARY OF THE INVENTION

The present invention is a system, method, and device for simulating an electro-optic emission signature of a weapon system or weapon platform for the purpose of testing an optical detection device. A projection system is provided that optically projects the emission signature in the ultraviolet, visible, and/or infrared spectral regions.

A projection screen is provided that has a concave curvature with respect to the projection system. The concave curvature produces a first focal point and a second focal point. Any light emanating from the second focal point (e.g.

projection system) toward the projection screen is reflected by the projection screen toward the first focal point. The projection system is positioned at the second focal point and the optical detection system is positioned at the first focal point. In this manner, the emission signature projected by the projection system is redirected toward the optical detection system. This enables the emission signature to be projected onto a screen and detected without any significant loss of intensity between projection and detection.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system, method and device can be used to test, calibrate and otherwise develop a variety of specialty cameras and sensor arrays that are purposed for detecting the emission signature of a weapon system or weapon platform. The camera system or sensor array being tested is herein referred to as the Device Under Test (DUT) in the following description. The present invention simulates the emission signature emitted from a weapon platform and/or a variety of weapon systems using different ammunition types at a variety of positions and orientations. These emission signatures are directed toward the DUT to test or calibrate the DUT. Two exemplary embodiments of the present invention system are illustrated and described. These embodiments are selected in order to set forth two of the best modes contemplated for the invention. The illustrated embodiments, however, are merely exemplary and should not be considered limitations when interpreting the scope of the appended claims.

Figure 1:
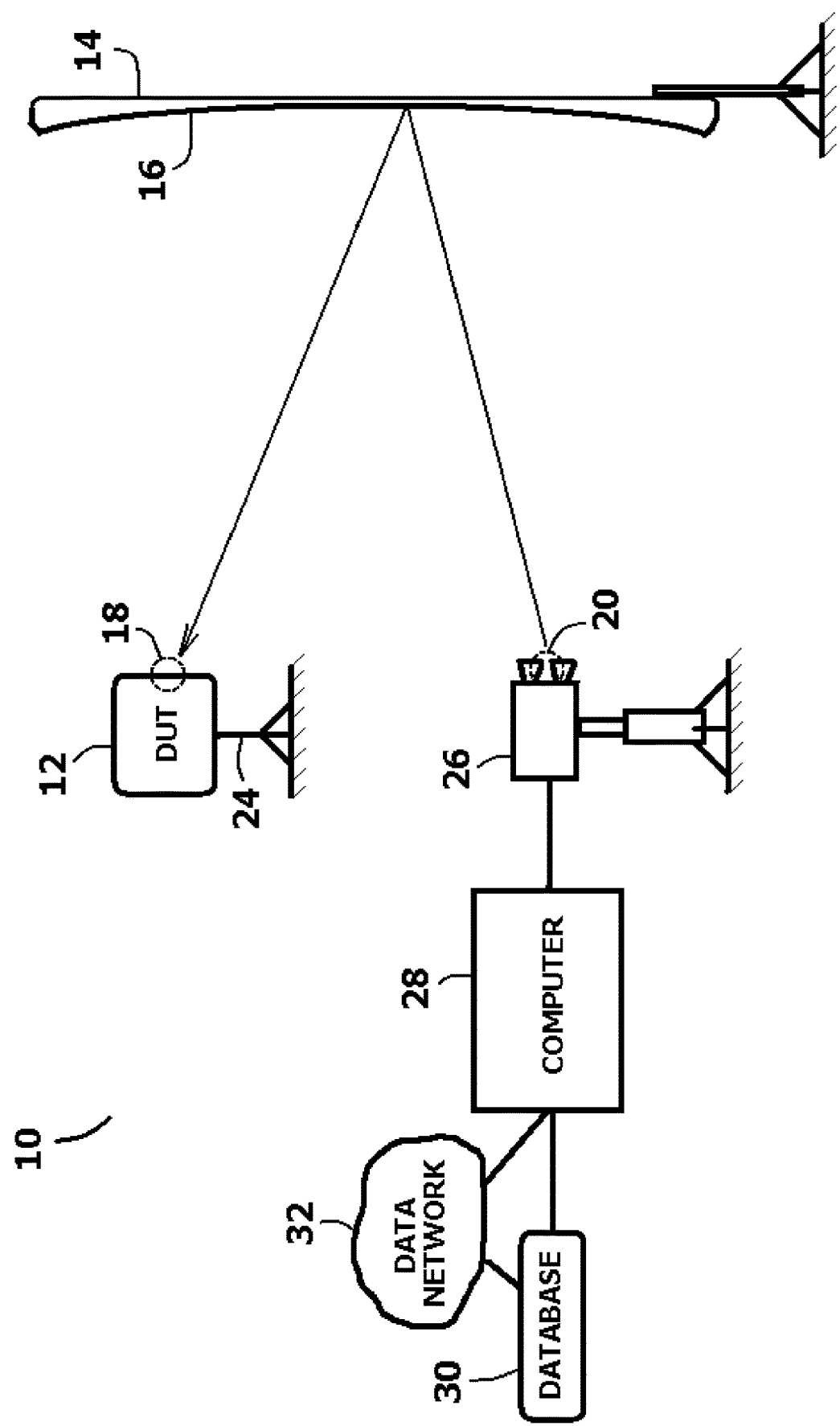
FIG. 1 is a schematic showing the hardware requirements of an exemplary embodiment of the present invention system.

Referring to FIG. 1, the hardware requirements of the present invention simulation system 10 are shown. The simulation system 10 simulates an emission signature for detection by a Device Under Test (DUT) 12. As previously explained, the DUT 12 can be any existing emission detection system under development or in need of calibration. Accordingly, the DUT 12 is an optical system that is designed to locate and/or identify enemy fire by analyzing the optical characteristics (intensity, temporal, spatial, spectral) of a signature, as seen from afar. The optical characteristics detected by the DUT 12 include the emission signature presented by the weapon system or weapon platform, the duration of the emission signature, the spatial extent of the source, and the intensity of the emission signature. The emission signature and duration of the emission signature are primarily utilized to identify the weapon platform or the weapon system and the ammunition being used by the enemy. The intensity and spatial extent of the emission signature is primarily used to determine the distance and orientation of the weapon platform and/or weapon system.

The DUT 12 can come in a variety of shapes and sizes, depending upon how it is deployed. For instance, if the DUT 12 is a sensor array from a tank or a helicopter, it is going to be larger and more complex than a DUT 12 carried by a soldier in the field.

Figure 2:
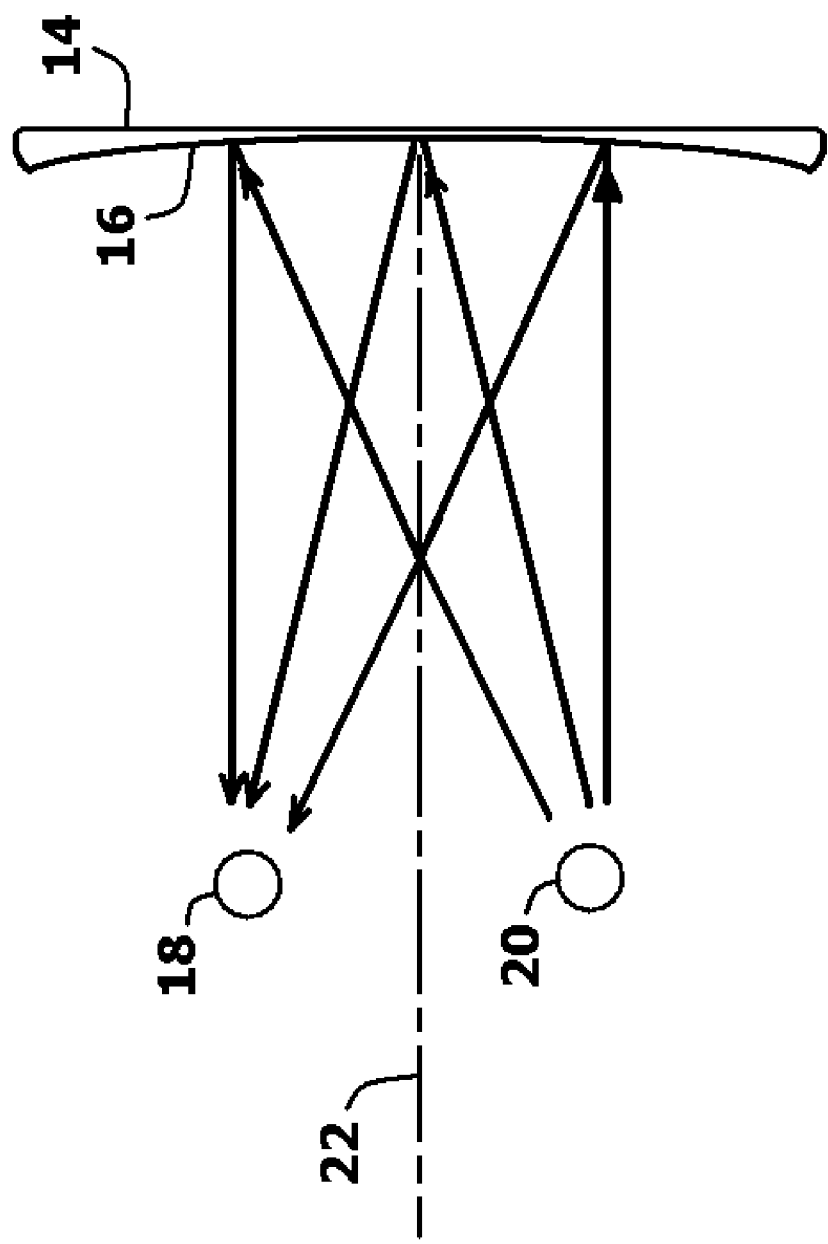
FIG. 2 shows the optical characteristics of the projection screen used in the exemplary system of FIG. 1.

To test the DUT 12 using a simulation, the DUT 12 must first be mounted in a position where it can observe a simulation. Accordingly, the DUT 12 is mounted at a first focal point position in front of a projection screen 14. As will be later explained, a simulation of a selected battlefield will be projected onto the projection screen 14. Referring to FIG. 2 in conjunction with FIG. 1, it can be seen that the projection screen 14 has a curved imaging surface 16 that provides a partially diffuse and partially specular reflection in the various spectral bands. The imaging surface 16 has a concave curvature. The concave shape is configured to cause reflections from the imaging surface 16 of the projection screen have two focal points 18, 20. Any light originating from a first focal point 18 will be directed toward the second focal point 20 and vice versa. The two focal points 18, 20 are equidistant from both the projection screen 14 and from a reference midplane 22 that bisects the concave curvature of the projection screen 14. Accordingly, the first focal point 18 is the same distance from both the reference midplane 22 and the projection screen 14 as is the second focal point 20. Should the distance between the first focal point 18 and the reference midplane 22 be increased or decreased, the distance of the second focal point 20 to the reference midplane 22 will also change, as if a mirrored image.

Figure 3:
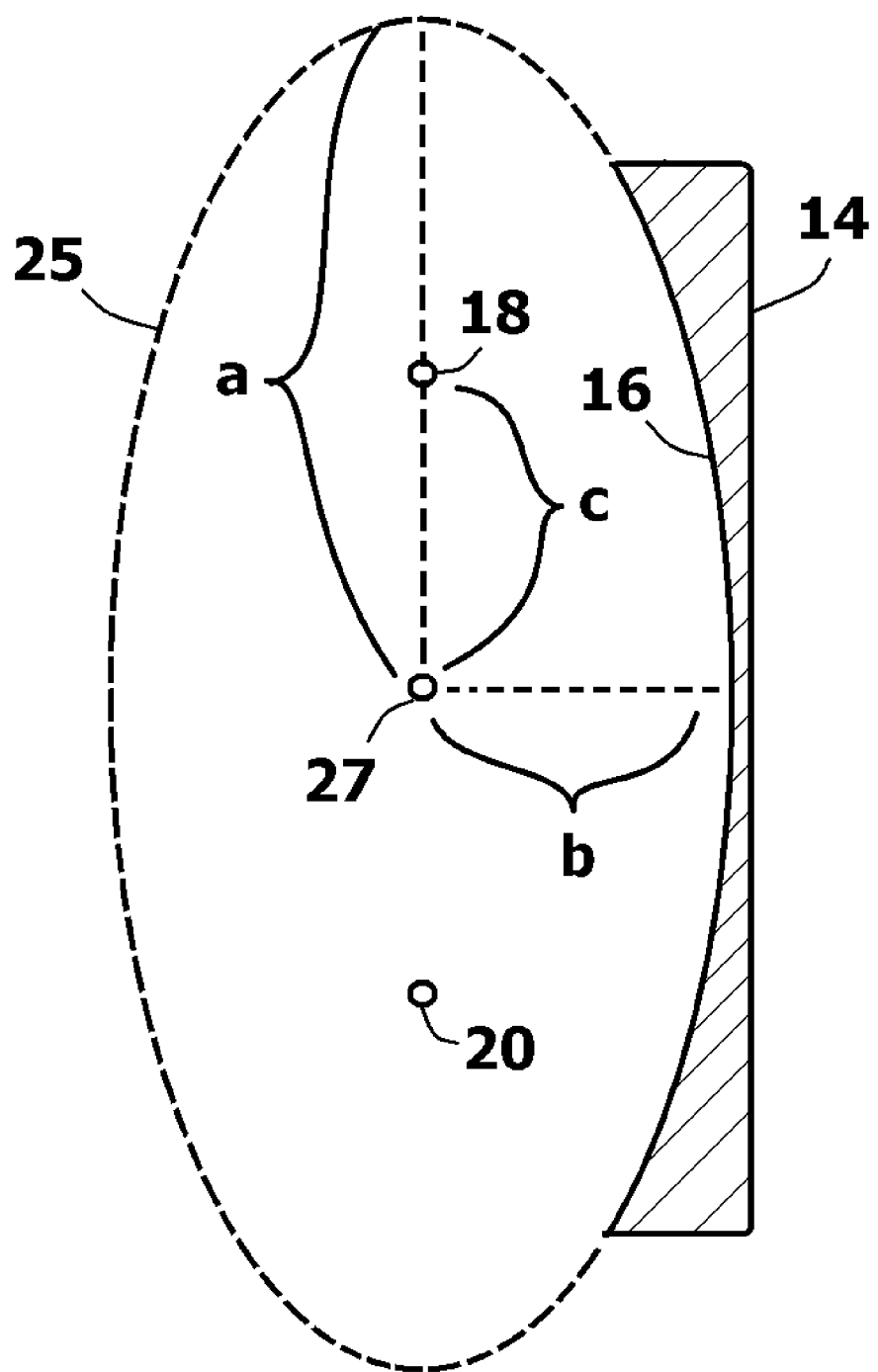
FIG. 3 illustrates an exemplary concave curvature for the production of the projection screen.

Referring to FIG. 3 in conjunction with FIG. 2, an exemplary embodiment of the imaging surface 16 of the projection screen is shown. In this example, the curvature of the imaging surface 16 is an ellipsoid 25. An ellipsoid curvature will focus emissions from a first focal point 18 to a second focal point 20 and vice versa. Other curvatures can be used to collimate light, if collimation is preferred over a point focus.

In the shown embodiment, the ellipsoid 25 has a center 27. The location of the two focal points 18, 20 is a function of the ellipsoid 25, where the distance in the vertical (c) away from the center 27 can be calculated using Equation 1 shown below:

$$c^2 = a^2 - b^2$$

where (a) is the long radius of the ellipsoid 25 and (b) is the short radius of the ellipsoid 25.

As has previously been stated, the DUT 12 may come in a variety of shapes and sizes. A mounting platform 24 is provided at the first focal point 18 in relation to the projection screen 14. The DUT 12 is mounted to the mounting platform 24 with its optical sensors facing the projection screen 14. For different DUTs, the distance between the optical sensors and the reference midplane 22 will vary. It will therefore be understood that different projection screens may be used to test different DUTs, wherein the DUT must be mountable at a focal point of the projection screen 14.

Returning to referencing FIG. 1, a projector system 26 is provided. The projector system 26 has the ability to project recorded emission signatures in the ultraviolet, visible and the infrared spectrums. The projector system 26 may be a single projector unit, or multiple projector units, whereby each projector unit projects in a specific frequency range. For example, one projector can be provided for projecting light in the visible spectrum and another projector can be provided to project light in the infrared spectrum.

The projector system 26 is positioned with its output at the second focal point 20 of the projection screen 14. In this manner, provided the projector system 26 projects toward the projection screen 14, the light in the various spectral regions emitted by the projector system 26 will reflect off the projection screen 14 and be directed at the first focal point 18 where the DUT 12 is mounted. The mounted position of the projector system 26 is adjustable to compensate for differences in the size of the DUT 12. In the optimized adjustment, the distance from the reference midplane 22 to the intake of the DUT 12 is equal to the distance from the reference midplane 22 to the output of the projector system 26.

Since the projector system 26 is located at the second focal point 20 and the DUT 12 is located at the first focal point 18, it will be understood that practically all of the light emitted by the projector system 26 will be received by the DUT 12. The projection screen 14 enables the simulated emission signature to move across a wide field of view, while simultaneously directing the reflected energy toward the DUT 12.

The simulation system 10 is operated by a computer 28. The computer 28 has access to a database 30 of emission signatures. This database 30 may be within the computer 28 or accessible by the computer 28 from another source, via a data network 32. Each signature may have a recorded profile (intensity, temporal, spectral) from an actual enemy weapon system that was fired or weapon platform that was used. The database 30 can contain thousands of recordings of various weapon platforms and weapons systems being fired using various ammunition loads at different distances and angles to the observer. Accordingly, when a particular signature is selected for display, it is projected onto the projection screen 14 in all of the spectral bands being simulated. Accordingly, the DUT 12 will detect the radiation in all the spectral bands as directed by the projection screen 14 onto the DUT 12. The DUT 12 can therefore be tested, calibrated or otherwise developed without having to incur the expense and complex logistics of observing live fire testing.

Since the various spectral bands of a spectral signature are being projected, variations can be readily made to compensate for different battlefield conditions. For example, on a real battlefield, there is often smoke and dust. In addition, the battlefield may be experiencing rain or fog. All these conditions absorb or scatter light energy and can significantly alter the intensity of the emission signature for a weapon system or weapon platform. Accordingly, the projection system 26 can alter the emission signatures being projected to be consistent with losses due to battlefield environment.

The ability of the simulation system 10 to compensate for changing conditions also enables the simulation system 10 to compensate for system losses. When light energy is projected toward the projection screen 14, some of that energy is absorbed or otherwise dissipated by the projection screen 14. The projection screen 14 has a set value for reflectivity. Reflectivity is the ratio of the power of the reflected signal to the power of the incoming signal. The amount of losses is often dependent upon the intensity and spectrum of the emission. The present invention simulation system 10 can automatically compensate for such losses. For example, suppose four percent (4%) of infrared energy and two percent (2%) visible light energy are lost by reflecting off the projection screen 14. The simulation system 10 can increase the intensity of the projected emission signature in each spectral band to compensate for the losses so that the emission signature received by the DUT 12 is highly accurate.

It will also be understood that the emission signatures themselves can be modeled simulations rather than actual recordings of enemy fire. If the emission signatures of a weapons system are particularly well known, so that the emission signature is known for any given distance and orientation, then a battlefield scenario can be simulated, and the appropriate emission signature added to the simulation when a simulated weapons system is fired.

Figure 4:
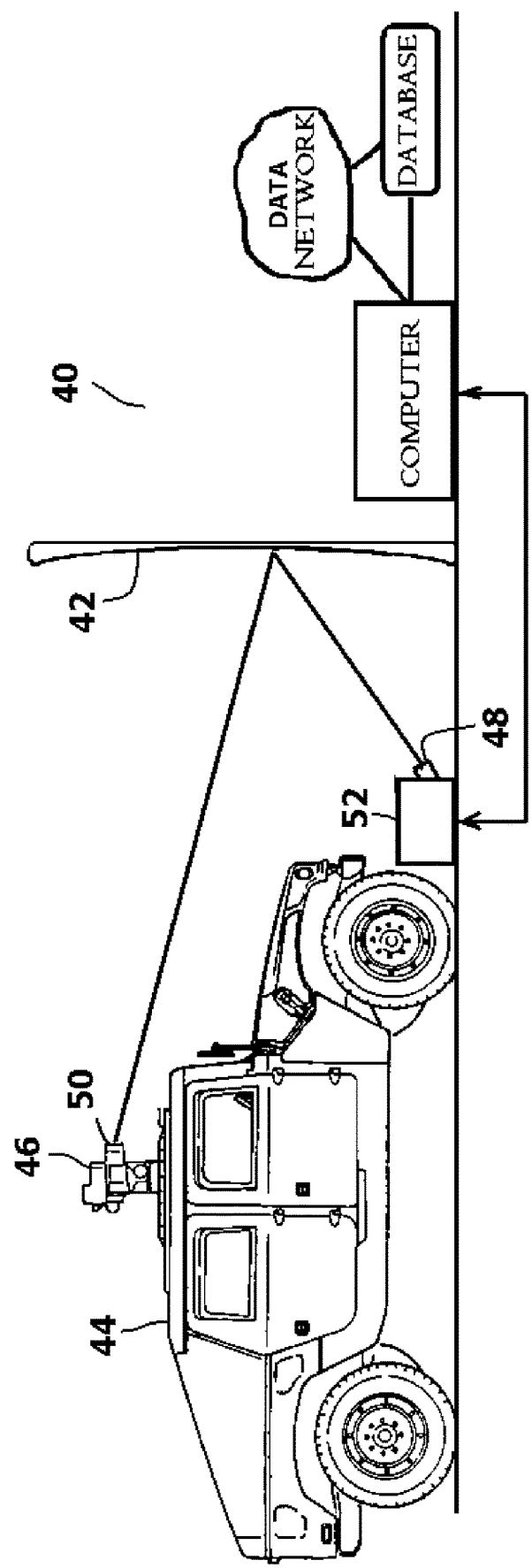
FIG. 4 shows an alternate embodiment of the present invention shown mounted for testing a vehicle installed sensor system.

The embodiment of FIG. 1 assumes that the DUT 12 is being tested in a lab, wherein the DUT 12 can be mounted at the first focal point 18 of the concave curvature of the projection screen. However, this is not always practical, especially when calibrating a system that is integrated into a tank, helicopter or other vehicle. Referring to FIG. 4, an alternate embodiment of the present invention simulation system 40 is shown. In this embodiment, a large projection screen 42 is set up in a garage, in a hanger or any place where an aircraft or vehicle can be conveniently tested. The projection screen 42 has the same concave curvature as was previously described and therefore reflects light between two focal points 48, 50. In the shown embodiment, the projection screen 42 is positioned adjacent a command vehicle 44. The command vehicle 44 has an emission signature detection system that serves as the DUT 46. The command vehicle 44 is positioned relative the projection screen 42 so that the DUT 46 on the vehicle 44 is positioned at the first focal point 48 of the ellipsoidal projection screen 42.

The projection system 52 is mounted at the second focal point 50. Light from the projection system 52 is emitted toward the projection screen 42. The projection screen 42 redirects the light to the DUT 46 mounted on the vehicle 44. The emission signature produced by the projection system 52 can be enhanced to compensate for losses caused by the light reflecting longer distances between the projection screen 42 and the DUT 46.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for simulating an emission signature for the purpose of testing an optical detection device, said system comprising:
   a projection system that optically projects said emission signature;
   a projection screen having a concave curvature that produces a first focal point and a second focal point that are equidistant from a common midplane and are equidistant from said projection screen, wherein any light emanating from said second focal point toward said projection screen is reflected by said projection screen toward said first focal point with reflectivity losses caused by said projection screen;
   wherein said projection system is positioned at said second focal point and said optical detection device is positioned at said first focal point.

2. The system according to claim 1, wherein said emission signature contains a representative intensity profile, temporal profile, and spectral profile, and wherein said projection system compensates for said reflectivity losses and optically projects said emission signature with said representative intensity profile, temporal profile, and spectral profile.

3. The system according to claim 1, wherein said emission signature includes light selected from a spectral range that includes ultraviolet, visible, and infrared.

4. The system according to claim 1, wherein said emission signature is selected from a database of emission signatures specifying representative signature characteristics.

5. A system for simulating an emission signature for the purpose of testing an optical detection device, said system comprising:
   a projection system that optically projects said emission signature;
   a projection screen having a curvature with a midplane, a first focal point and a second focal point, wherein said first focal point and said second focal point are equidistant from both said projection screen and said midplane,
   wherein said optical detection device is positioned at said first focal point, and
   wherein any of said emission signature emanating from said second focal point toward said projection screen is reflected by said projection screen toward said first focal point.

6. The system according to claim 5, wherein said projection screen has reflectivity losses and said emission signature is adjusted to compensate for said reflectivity losses.

7. The system according to claim 5, wherein said emission signature is selected from a database of emission signatures specifying representative signature characteristics.

8. A method for simulating an emission signature for the purpose of testing an optical detection device, said method comprising the steps of:
   providing a curved projection screen that directs light emanating from a first focal point to a second focal point that is separate and distinct from said first focal point, wherein said first focal point and said second focal point are equidistant from said curved projection screen;
   positioning a projection system at said first focal point that optically projects said emission signature toward said curved projection screen;
   positioning said optical detection device at said second focal point, wherein said curved projection screen directs said emission signature projected from said projection system toward said optical detection device.

9. The method according to claim 8, wherein providing a curved projection screen includes providing said curved projection screen with a midplane, wherein said first focal point and said second focal point are equidistant from said midplane.

10. The method according to claim 8, wherein said emission signature includes light selected from ultraviolet, visible and infrared spectrums.

11. The method according to claim 8, wherein said curved projection screen has reflectivity losses and said method includes adjusting said emission signature to compensate for said reflectivity losses.

* * * * *